United States Patent
Yu et al.

(10) Patent No.: US 10,186,972 B2
(45) Date of Patent: Jan. 22, 2019

(54) CONTROLLER APPLIED TO A SECONDARY SIDE OF A POWER CONVERTOR AND OPERATION METHOD THEREOF

(71) Applicant: Leadtrend Technology Corp., Hsinchu County (TW)

(72) Inventors: Hsiang-Feng Yu, Hsinchu County (TW); Ching-Tsan Lee, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 15/963,114

(22) Filed: Apr. 26, 2018

(65) Prior Publication Data

US 2018/0316271 A1 Nov. 1, 2018

(30) Foreign Application Priority Data

Apr. 28, 2017 (TW) .............................. 106114182 A

(51) Int. Cl.
*H02M 3/335* (2006.01)

(52) U.S. Cl.
CPC .............................. *H02M 3/33515* (2013.01)

(58) Field of Classification Search
CPC ............. H02M 3/335; H02M 3/33507; H02M 3/33515; H02M 3/33523; H02M 7/537; H02M 7/53846; H02M 7/53862; H02M 7/5395

See application file for complete search history.

(56) References Cited

U.S. PATENT DOCUMENTS

| 7,466,569 B2 * | 12/2008 | Yang ................. H02M 3/33507 363/21.03 |
| 8,774,254 B2 * | 7/2014 | Yang ................. H02M 3/33523 363/21.15 |
| 2014/0204628 A1 | 7/2014 | Gaknoki |
| 2015/0372603 A1 * | 12/2015 | Tang ................. H02M 3/33523 363/21.15 |

FOREIGN PATENT DOCUMENTS

| CN | 103166473 A | 6/2013 |
| TW | 201406034 A | 2/2014 |
| TW | I569564 B | 2/2017 |

* cited by examiner

*Primary Examiner* — Gary L Laxton
(74) *Attorney, Agent, or Firm* — Winston Hsu

(57) ABSTRACT

A controller applied to a secondary side of a power convertor includes a sampling/tracking circuit and a comparator. The sampling/tracking circuit is coupled to the secondary side of the power convertor for generating a sampling value corresponding to an output voltage of the power convertor when a sampling signal is enabled, and generating a tracking value corresponding to the output voltage. The comparator is coupled to the sampling/tracking circuit for generating a warning signal to a primary-side regulation controller of the power converter according to the sampling value and the tracking value during an enabling period of a tracking signal. The primary-side regulation controller adjusts a frequency of a gate control signal according to the warning signal, and the sampling signal and the tracking signal are not enabled simultaneously.

11 Claims, 5 Drawing Sheets

CONTROLLER APPLIED TO A SECONDARY SIDE OF A POWER CONVERTOR AND OPERATION METHOD THEREOF

BACKGROUND OF THE INVENTION

1. Field of the Invention

The present invention relates a controller applied to a secondary side of a power convertor and an operation method thereof, and particularly to a controller and an operation method thereof that can make a primary-side regulation controller of a power converter to rapidly respond to sudden increase of a load of the power converter.

2. Description of the Prior Art

When a load of a secondary side of a power converter is light, a frequency of a gate control signal generated by a regulation controller of a primary side of the power convertor is lower, so meanwhile, a period of the gate control signal is longer. Therefore, when the load of the secondary side of the power convertor is suddenly significantly increased, because output power of the secondary side of the power convertor is provided only by a capacitor coupled to the secondary side of the power convertor, an output voltage of the secondary side of the power convertor will be reduced drastically accordingly. That is to say, because the frequency of the gate control signal is lower, a response of the regulation controller corresponding to variation of the output voltage is also slower, resulting in the regulation controller not rapidly responding to sudden increase of the load to make the output voltage be reduced drastically. Therefore, how to design a controller that can make the regulation controller rapidly respond to sudden increase of the load becomes an important issue.

SUMMARY OF THE INVENTION

An embodiment of the present invention provides a controller applied to a secondary side of a power convertor. The controller includes a sampling/tracking circuit and a comparator. The sampling/tracking circuit is coupled to the secondary side of the power convertor for generating a sampling value corresponding to an output voltage of the power convertor when a sampling signal is enabled, and generating a tracking value corresponding to the output voltage. The comparator is coupled to the sampling/tracking circuit for generating a warning signal to a primary-side regulation (PSR) controller of the power converter according to the sampling value and the tracking value during an enabling period of a tracking signal, wherein when the tracking value is less than the sampling value, the comparator generates the warning signal to the primary-side regulation controller. The primary-side regulation controller adjusts a frequency of a gate control signal corresponding to a power switch of a primary side of the power convertor according to the warning signal, and the sampling signal and the tracking signal are not enabled simultaneously.

Another embodiment of the present invention provides a controller applied to a secondary side of a power convertor. The controller includes a sampling/tracking circuit and a comparator, and the sampling/tracking circuit includes a voltage dividing unit, a regulator, and a current mirror. The sampling/tracking circuit is coupled to the secondary side of the power convertor for generating a sampling value corresponding to an output voltage of the power convertor when a sampling signal is enabled, and generating a tracking value corresponding to the output voltage. The voltage dividing unit is coupled to the secondary side of the power convertor for generating a divided voltage according to the output voltage; the regulator is coupled to the voltage dividing unit for generating a first voltage according to the divided voltage, wherein the first voltage corresponds to the output voltage; and the current mirror is coupled to the regulator and the comparator for generating the sampling value according to the first voltage when the sampling signal is enabled, and generating the tracking value according to the first voltage during the enabling period of the tracking signal. The comparator is coupled to the sampling/tracking circuit for generating a warning signal to a primary-side regulation controller of the power converter according to the sampling value and the tracking value during an enabling period of a tracking signal. The primary-side regulation controller adjusts a frequency of a gate control signal corresponding to a power switch of a primary side of the power convertor according to the warning signal, and the sampling signal and the tracking signal are not enabled simultaneously.

Another embodiment of the present invention provides a controller applied to a secondary side of a power convertor. The controller includes a sampling/tracking circuit and a comparator, and the sampling/tracking circuit includes a voltage dividing unit, a regulator, and a current mirror. The sampling/tracking circuit is coupled to the secondary side of the power convertor for generating a sampling value corresponding to an output voltage of the power convertor when a sampling signal is enabled, and generating a tracking value corresponding to the output voltage. The voltage dividing unit is coupled to the secondary side of the power convertor for generating a divided voltage according to the output voltage; the regulator is coupled to the voltage dividing unit for generating a first voltage according to the divided voltage, wherein the first voltage corresponds to the output voltage; and the current mirror is coupled to the regulator and the comparator for generating the sampling value according to the first voltage when the sampling signal is enabled, and generating the tracking value according to the first voltage. The comparator is coupled to the sampling/tracking circuit for generating a warning signal to a primary-side regulation controller of the power converter according to the sampling value and the tracking value during an enabling period of a tracking signal. The primary-side regulation controller adjusts a frequency of a gate control signal corresponding to a power switch of a primary side of the power convertor according to the warning signal, and the sampling signal and the tracking signal are not enabled simultaneously.

Another embodiment of the present invention provides an operation method of a controller applied to a secondary side of a power convertor, wherein the controller includes a sampling/tracking circuit and a comparator. The operation method includes the sampling/tracking circuit generating a sampling value corresponding to an output voltage of the power convertor when a sampling signal is enabled; the sampling/tracking circuit generating a tracking value corresponding to the output voltage; and the comparator generating a warning signal to a primary-side regulation controller of the power converter when the tracking value is less than the sampling value during an enabling period of a tracking signal. The primary-side regulation controller adjusts a frequency of a gate control signal corresponding to a power switch of a primary side of the power convertor according to the warning signal, and the sampling signal and the tracking signal are not enabled simultaneously.

The present invention provides a controller applied to a secondary side of a power convertor and an operation method thereof. The controller and the operation method utilize a sampling/tracking circuit to generate a sampling value corresponding to an output voltage of the power convertor and a tracking value corresponding to the output voltage of the power convertor, and utilize a comparator to generate a warning signal to a primary-side regulation controller according to the sampling value and the tracking value. Then, the primary-side regulation controller can increase a frequency of a gate control signal of a power switch of a primary side of the power convertor according to the warning signal. Therefore, compared to the prior art, the present invention has advantages as follows: first, because the tracking value corresponds to a real-time output voltage of the power converter, the present invention is suitable for applications requiring a variable output voltage of the power converter; and second, because the present invention determines whether to generate the warning signal to the primary-side regulation controller according to decrease percentage of the output voltage, the present invention can prevent ripple noise from making the comparator to generate the warning signal to the primary-side regulation controller when the output voltage is higher These and other objectives of the present invention will no doubt become obvious to those of ordinary skill in the art after reading the following detailed description of the preferred embodiment that is illustrated in the various figures and drawings.

DETAILED DESCRIPTION

Figure 1:
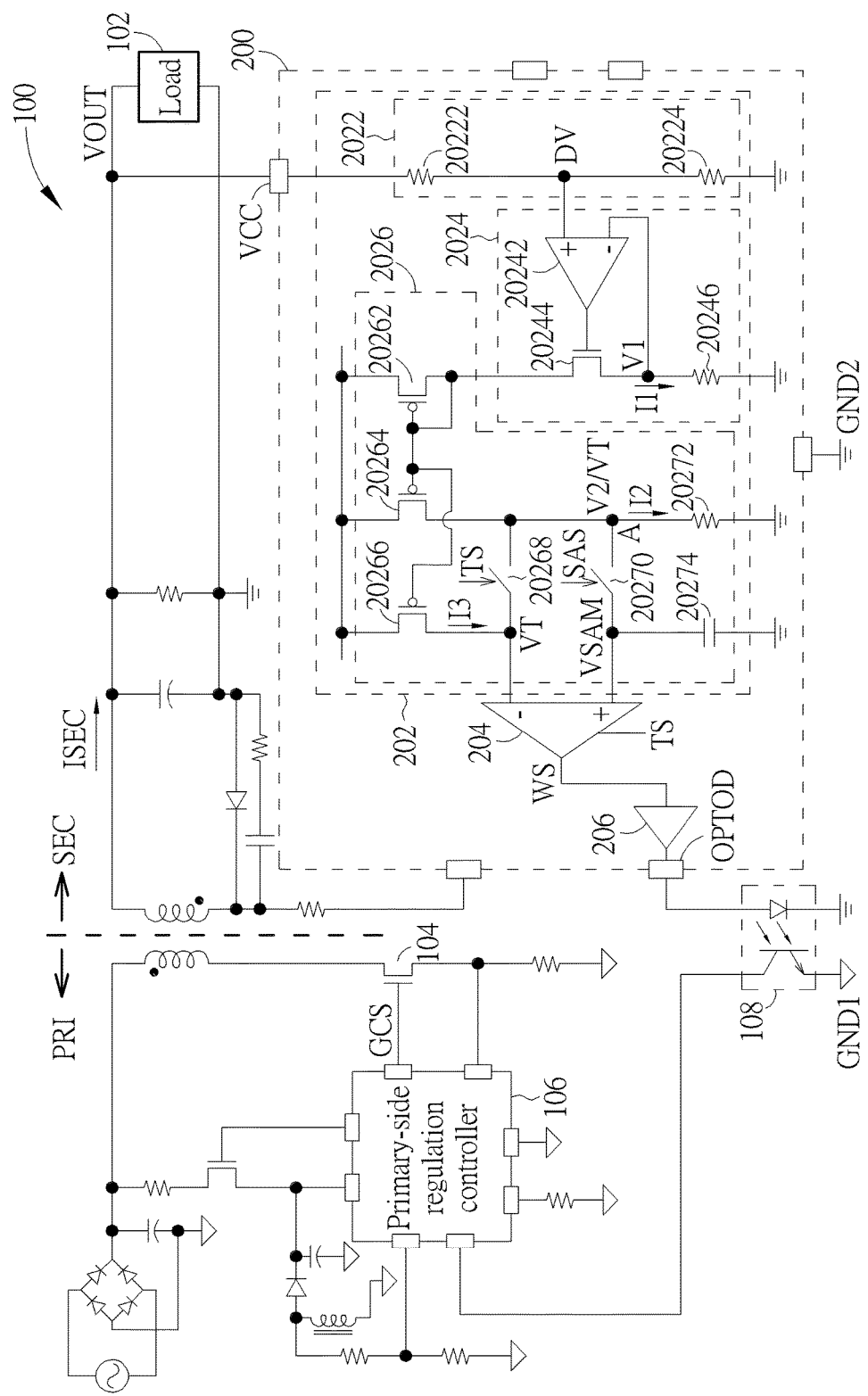
FIG. 1 is a diagram illustrating a controller applied to a secondary side of a power converter according to a first embodiment of the present invention.

Please refer to FIG. 1. FIG. 1 is a diagram illustrating a controller 200 applied to a secondary side SEC of a power converter 100 according to a first embodiment of the present invention. As shown in FIG. 1, the controller 200 includes a sampling/tracking circuit 202 and a comparator 204, wherein the sampling/tracking circuit 202 is coupled to the secondary side SEC of the power converter 100, and the comparator 204 is coupled to the sampling/tracking circuit 202.

As shown in FIG. 1, the sampling/tracking circuit 202 includes a voltage dividing unit 2022, a regulator 2024, and a current mirror 2026. The voltage dividing unit 2022 includes a first resistor 20222 and a second resistor 20224, wherein the voltage dividing unit 2022 is coupled to the secondary side SEC of the power converter 100 for receiving an output voltage VOUT of the secondary side SEC of the power converter 100 through a pin VCC, and utilizes the first resistor 20222 and the second resistor 20224 to divide the output voltage VOUT to generate a divided voltage DV through equation (1):

$$DV = \frac{R_{20224}}{R_{20222} + R_{20224}} \times VOUT \quad (1)$$

As shown in equation (1), $R_{20222}$ is a resistance of the first resistor 20222 and $R_{20224}$ is a resistance of the second resistor 20224. In addition, coupling relationships between the first resistor 20222 and the second resistor 20224 can be referred to FIG. 1, so further description thereof is omitted for simplicity.

The regulator 2024 includes an optional amplifier 20242, an N-type metal-oxide-semiconductor transistor 20244, and a third resistor 20246, wherein the regulator 2024 is coupled to the voltage dividing unit 2022 for generating a first voltage V1 according to the divided voltage DV when the N-type metal-oxide-semiconductor transistor 20244 operates normally, the first voltage V1 relates to the output voltage VOUT, the first voltage V1 is equal to the divided voltage DV, and the first voltage V1 and the third resistor 20246 can determine a first current I1 through equation (2):

$$I1 = \frac{VOUT}{R_{20246}} \times \frac{R_{20224}}{R_{20222} + R_{20224}} \quad (2)$$

As shown in equation (2), $R_{20246}$ is a resistance of the third resistor 20246. In addition, coupling relationships between the optional amplifier 20242, the N-type metal-oxide-semiconductor transistor 20244, and the third resistor 20246 can be referred to FIG. 1, so further description thereof is omitted for simplicity.

In addition, as shown in FIG. 1, the current mirror 2026 is coupled to the regulator 2024 and the comparator 204, wherein the current mirror 2026 includes a first P-type metal-oxide-semiconductor transistor 20262, a second P-type metal-oxide-semiconductor transistor 20264, a third P-type metal-oxide-semiconductor transistor 20266, a first switch 20268, a second switch 20270, a fourth switch 20272, and a first capacitor 20274, wherein a ratio of width to length of the third P-type metal-oxide-semiconductor transistor 20266 is equal to a ratio of width to length of the first P-type metal-oxide-semiconductor transistor 20262, a ratio of width to length of the second P-type metal-oxide-semiconductor transistor 20264 is equal to N times the ratio of width to length of the first P-type metal-oxide-semiconductor transistor 20262, and N is a real number greater than 1. In addition, coupling relationships between the first P-type metal-oxide-semiconductor transistor 20262, the second P-type metal-oxide-semiconductor transistor 20264, the third P-type metal-oxide-semiconductor transistor 20266, the first switch 20268, the second switch 20270, the fourth switch 20272, and the first capacitor 20274 can be referred to FIG. 1, so further description thereof is omitted for simplicity. In addition, the present invention is not limited to the ratio of width to length of the third P-type metal-oxide-semiconductor transistor 20266 being equal to the ratio of width to length of the first P-type metal-oxide-semiconductor transistor 20262. That is to say, in another embodiment of the present invention, the ratio of width to length of the third P-type metal-oxide-semiconductor transistor 20266 is not equal to the ratio of width to length of the first P-type metal-oxide-semiconductor transistor 20262. As shown in FIG. 1, because the ratio of width to length of the second P-type metal-oxide-semiconductor transistor 20264 is equal to N times the ratio of width to length of the first P-type metal-oxide-semiconductor transistor 20262, a second current I2 flowing through the second P-type metal-oxide-semiconductor transistor 20264 is equal to N times the first current I1, and a third current I3 flowing through the third P-type metal-oxide-semiconductor transistor 20266 is equal to the first current I1, wherein the second current I2 can be represented by equation (3):

$$I2 = N \times I1 = N \times \frac{VOUT}{R_{20246}} \times \frac{R_{20224}}{R_{20222} + R_{20224}} \quad (3)$$

Figure 2:
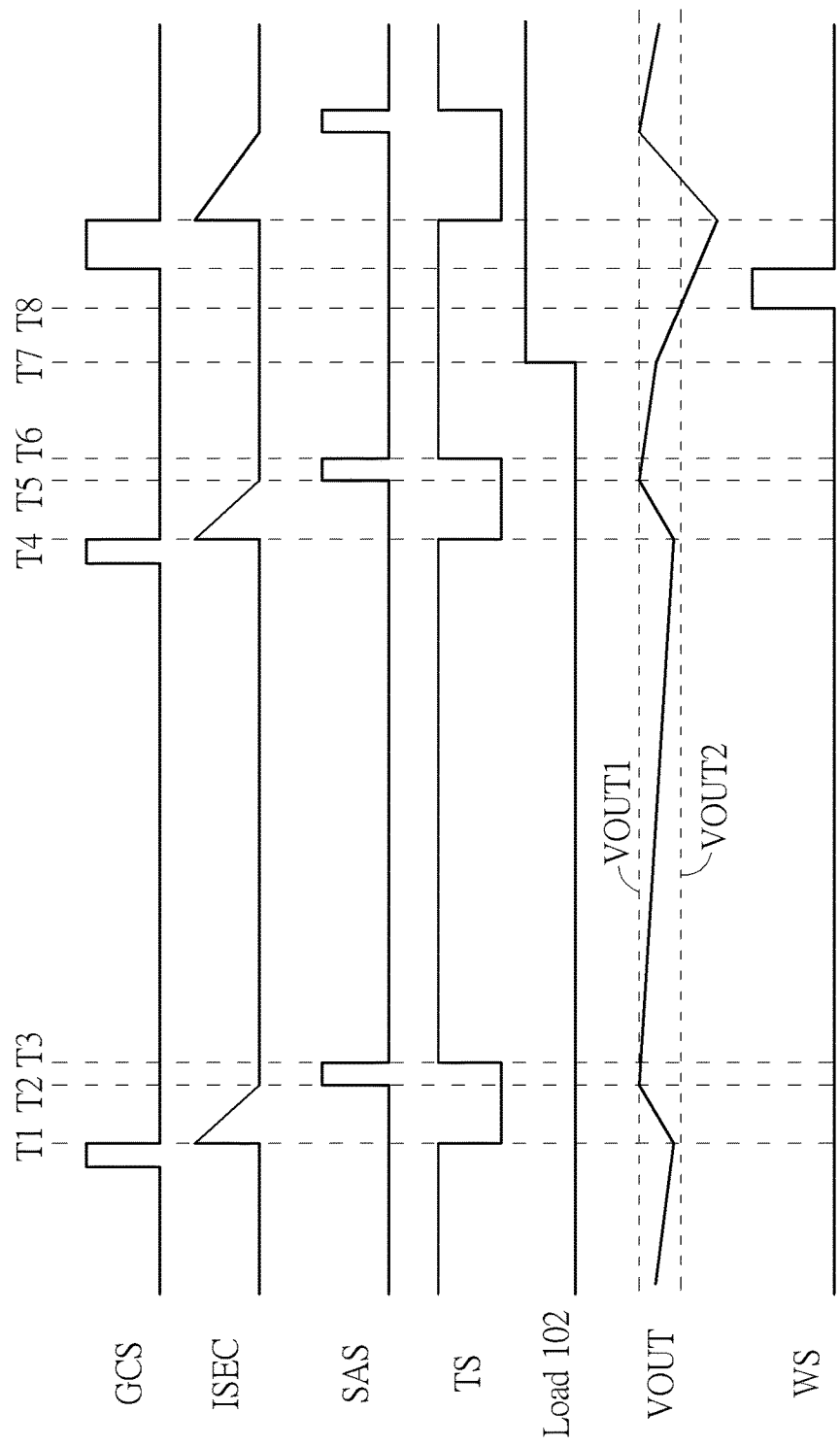
FIG. 2 is a timing diagram illustrating a gate control signal corresponding to a power switch of a primary side of the power converter, a current of the secondary side of the power converter, a sampling signal, a tracking signal, variation of a load of the secondary side of the power converter, the output voltage, and a warning signal.

Please refer to FIG. 2. FIG. 2 is a timing diagram illustrating a gate control signal GCS corresponding to a power switch 104 of a primary side PRI of the power converter 100, a current ISEC of the secondary side SEC of the power converter 100, a sampling signal SAS, a tracking signal TS, variation of a load 102 of the secondary side SEC of the power converter 100, the output voltage VOUT, and a warning signal WS, wherein the sampling signal SAS and the tracking signal TS are generated by a signal generator (not shown in FIG. 1) of the controller 200, the sampling signal SAS and the tracking signal TS are not enabled simultaneously, and the sampling signal SAS and the tracking signal TS correspond to the gate control signal GCS. As shown in FIG. 2, at a time T1, the gate control signal GCS is disabled, so the secondary side SEC of the power converter 100 starts to discharge (meanwhile, the current ISEC has a maximum value, and the tracking signal TS is also disabled). At a time T2, the secondary side SEC of the power converter 100 discharges completely, and the sampling signal SAS is enabled. As shown in FIG. 1, at the time T2, a second voltage V2 (corresponding to the time T2) of a node A within the sampling/tracking circuit 202 can be represented by equation (4), wherein $R_{20272}$ is a resistance of the fourth switch 20272 and VOUT1 is the output voltage VOUT corresponding to the sampling signal SAS (as shown in FIG. 2, because at the time T2, the secondary side SEC of the power converter 100 discharges completely, VOUT1 is a maximum value of the output voltage VOUT):

$$V2 = N \times \frac{VOUT1}{R_{20246}} \times \frac{R_{20224}}{R_{20222} + R_{20224}} \times R_{20272} \quad (4)$$

Because the sampling signal SAS is enabled, the second switch 20270 is turned on, resulting in the second voltage V2 of the node A staring to charge the first capacitor 20274 to generate a sampling value VSAM equal to the second voltage V2 at a positive input terminal of the comparator 204 (that is, at the time T2, the first capacitor 20274 will store the sampling value VSAM).

As shown in FIGS. 1, 2, at a time T3, because the sampling signal SAS is disabled and the tracking signal TS is enabled, the second switch 20270 is turned off, and the first switch 20268 and the comparator 204 are turned on, wherein the tracking signal TS is enabled until a time T4. Therefore, as shown in FIG. 1, between the time T3 and the time T4, because the tracking signal TS is enabled, the first switch 20268 is turned on, resulting in a tracking value VT corresponding to a time interval between the time T3 and the time T4 being generated at a negative input terminal of the comparator 204 and the node A (that is, the sampling/tracking circuit 202 generates the tracking value VT during an enabling period of the tracking signal TS), wherein the tracking value VT can be represented by equation (5):

$$VT = (I2 + I3) \times R_{20272} \quad (5)$$
$$= (N + 1) \times \frac{VOUT}{R_{20246}} \times \frac{R_{20224}}{R_{20222} + R_{20224}} \times R_{20272}$$

In addition, operation of the controller 200 at the time T4, a time T5, and a time T6 can be referred to operation of the controller 200 at the time T1, the time T2, and the time T3, so further description thereof is omitted for simplicity.

Between the time T3 and the time T4, because the tracking signal TS is enabled, the comparator 204 is turned on. Therefore, between the time T3 and the time T4 (that is, during the enabling period of the tracking signal TS), the comparator 204 can continuously compare the tracking value VT (as shown in equation (5), the tracking value VT has real-time information of the output voltage VOUT) with the sampling value VSAM.

Before a time T7, because the load 102 is light, a frequency of the gate control signal GCS generated by a primary-side regulation (PSR) controller 106 of the primary side PRI of the power converter 100 is lower (e.g. the frequency of the gate control signal GCS can be less than 1 KHz). Therefore, if at the time T7, the load 102 is increased suddenly, because the frequency of the gate control signal GCS is lower, a response of the primary-side regulation controller 106 corresponding to variation of the output voltage VOUT is also slower, resulting in the output voltage VOUT being reduced drastically. Therefore, at a time T8, the tracking value VT is equal to the sampling value VSAM, wherein a relationship between the output voltage VOUT corresponding to the sampling signal SAS (that is, VOUT1) and the output voltage VOUT corresponding to the time T8 (that is, VOUT2) can be determined by equation (6):

$$VT = VSAM \quad (6)$$
$$(N + 1) \times \frac{VOUT2}{R_{20246}} \times \frac{R_{2024}}{R_{20222} + R_{20224}} \times R_{20272} =$$
$$N \times \frac{VOUT1}{R_{20246}} \times \frac{R_{20224}}{R_{20222} + R_{20224}} \times R_{20272}$$
$$VOUT2 = \frac{N}{N + 1} \times VOUT1$$

If N is equal to 19, when VOUT2 is less than 0.95* (VOUT1) (that is, after the time T8), the comparator 204 will generate the warning signal WS to the primary-side regulation controller 106 through a driving circuit 206 further included in the controller 200, a pin OPOD, and a photo coupler 108, wherein the primary-side regulation controller 106 can increase an enabling period of the gate control signal GCS and the frequency of the gate control signal GCS according to the warning signal WS to rapidly respond to sudden increase of the load 102. But, in another embodiment of the present invention, because the comparator 204 has greater driving capability, the warning signal WS generated by the comparator 204 is transmitted to the primary-side regulation controller 106 directly through the pin OPTOD and the photo coupler 108. That is to say, when the comparator 204 has greater driving capability, the driving circuit 206 can be neglected.

In addition, the present invention is not limited to the timings of the sampling signal SAS and the tracking signal TS shown in FIG. 2. That is to say, any configuration in which the sampling signal SAS and the tracking signal TS are not enabled simultaneously falls within the scope of the present invention.

In addition, ground GND1 of the primary side PRI of the power converter 100 can be equal to or different from ground GND2 of the secondary side SEC of the power converter 100.

Figure 3A:
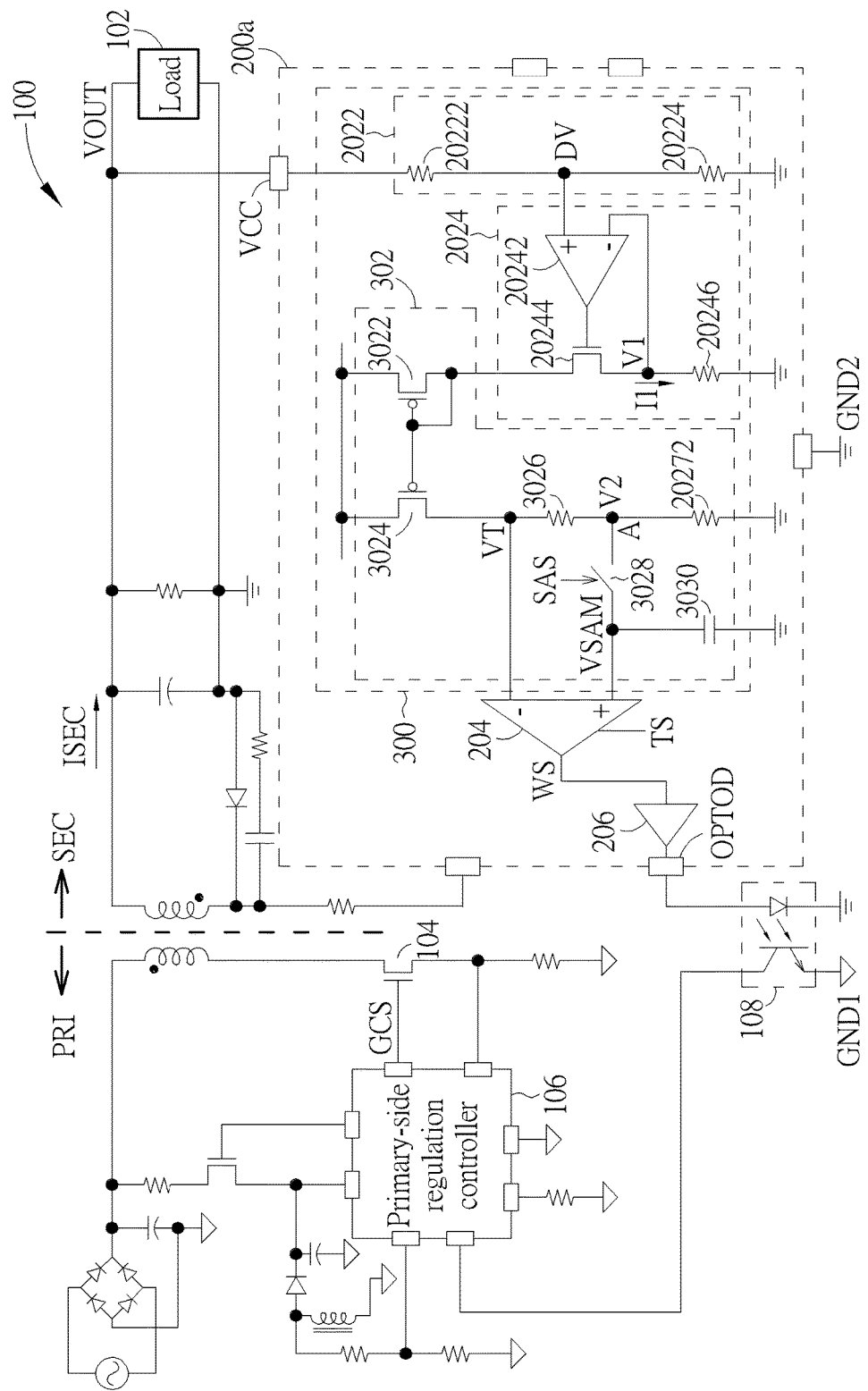
FIG. 3A is a diagram illustrating a controller applied to the secondary side of the power converter according to a second embodiment of the present invention.

Please refer to FIG. 3A. FIG. 3A is a diagram illustrating a controller 200a applied to the secondary side SEC of the power converter 100 according to a second embodiment of the present invention. As shown in FIG. 3A, a difference between the controller 200a and the controller 200 is that a current mirror 302 included in a sampling/tracking circuit 300 of the controller 200a continuously generates the tracking value VT according to the first voltage V1 (that is, no matter whether the tracking signal TS is enabled, the sampling/tracking circuit 300 continuously generates the tracking value VT according to the first voltage V1). As shown in FIG. 3A, the current mirror 302 includes a fourth P-type metal-oxide-semiconductor transistor 3022, a fifth P-type metal-oxide-semiconductor transistor 3024, a fourth switch 20272, a fifth resistor 3026, a third switch 3028, and a second capacitor 3030, wherein coupling relationships between the fourth P-type metal-oxide-semiconductor transistor 3022, the fifth P-type metal-oxide-semiconductor transistor 3024, the fourth switch 20272, the fifth resistor 3026, the third switch 3028, and the second capacitor 3030 can be referred to FIG. 3A, so further description thereof is omitted for simplicity. In addition, a ratio of width to length of the fifth P-type metal-oxide-semiconductor transistor 3024 is equal to a ratio of width to length of the fourth P-type metal-oxide-semiconductor transistor 3022. But, the present invention is not limited to the ratio of width to length of the fifth P-type metal-oxide-semiconductor transistor 3024 being equal to the ratio of width to length of the fourth P-type metal-oxide-semiconductor transistor 3022.

Please refer to FIGS. 2, 3A. As shown in FIG. 2, at the time T2, the secondary side SEC of the power converter 100 discharges completely, and the sampling signal SAS is enabled. As shown in FIG. 3A, at the time T2, a second voltage V2 (corresponding to the time T2) of a node A of the current mirror 302 can be represented by equation (7), wherein VOUT1 is the output voltage VOUT corresponding to the sampling signal SAS (as shown in FIG. 2, because at the time T2, the secondary side SEC of the power converter 100 discharges completely, VOUT1 is the maximum value of the output voltage VOUT):

$$V2 = \frac{VOUT1}{R_{20246}} \times \frac{R_{20224}}{R_{20222} + R_{20224}} \times R_{20272} \qquad (7)$$

Because the sampling signal SAS is enabled, the third switch 3028 is turned on, resulting in the second voltage V2 of the node A staring to charge the second capacitor 3030 to generate the sampling value VSAM equal to the second voltage V2 at the positive input terminal of the comparator 204 (that is, at the time T2, the second capacitor 3030 will store the sampling value VSAM). In addition, the tracking value VT can be determined by equation (8), wherein $R_{3026}$ is a resistance of the fifth resistor 3026:

$$VT = V2 + I2 \times R_{3026} \qquad (8)$$

$$= \frac{VOUT}{R_{20246}} \times \frac{R_{20224}}{R_{20222} + R_{20224}} \times R_{20272} + \frac{VOUT}{R_{20246}} \times \frac{R_{20224}}{R_{20222} + R_{20224}} \times R_{3026}$$

$$= \frac{VOUT}{R_{20246}} \times \frac{R_{20224}}{R_{20222} + R_{20224}} \times (R_{20272} + R_{3026})$$

As shown in equation (8), when $R_{20272}$ is equal to N times $R_{3026}$, equation (8) can be rewritten to generate equation (9):

$$VT = \frac{VOUT}{R_{20246}} \times \frac{R_{20224}}{R_{20222} + R_{20224}} \times R_{3026} \times (N + 1) \qquad (9)$$

In addition, the sampling value VSAM can be determined by equation (10):

$$VASM = \frac{VOUT1}{R_{20246}} \times \frac{R_{20224}}{R_{20222} + R_{20224}} \times R_{3026} \times N \qquad (10)$$

Therefore, as shown in FIG. 2, if at the time T7, the load 102 is increased suddenly, because the frequency of the gate control signal GCS is lower, the response of the primary-side regulation controller 106 corresponding to variation of the output voltage VOUT is also slower, resulting in the output voltage VOUT being reduced drastically. Therefore, at the time T8, the tracking value VT is equal to the sampling value VSAM, wherein the relationship between the output voltage VOUT corresponding to the sampling signal SAS (that is, VOUT1) and the output voltage VOUT corresponding to the time T8 (that is, VOUT2) can be determined by equation (6). Therefore, after the time T8, the comparator 204 will generate the warning signal WS to the primary-side regulation controller 106, wherein the primary-side regulation controller 106 can increase the enabling period and the frequency of the gate control signal GCS according to the warning signal WS to rapidly respond to sudden increase of the load 102. In addition, subsequent operational principles of the controller 200a are the same as those of the controller 200, so further description thereof is omitted for simplicity.

Figure 3B:
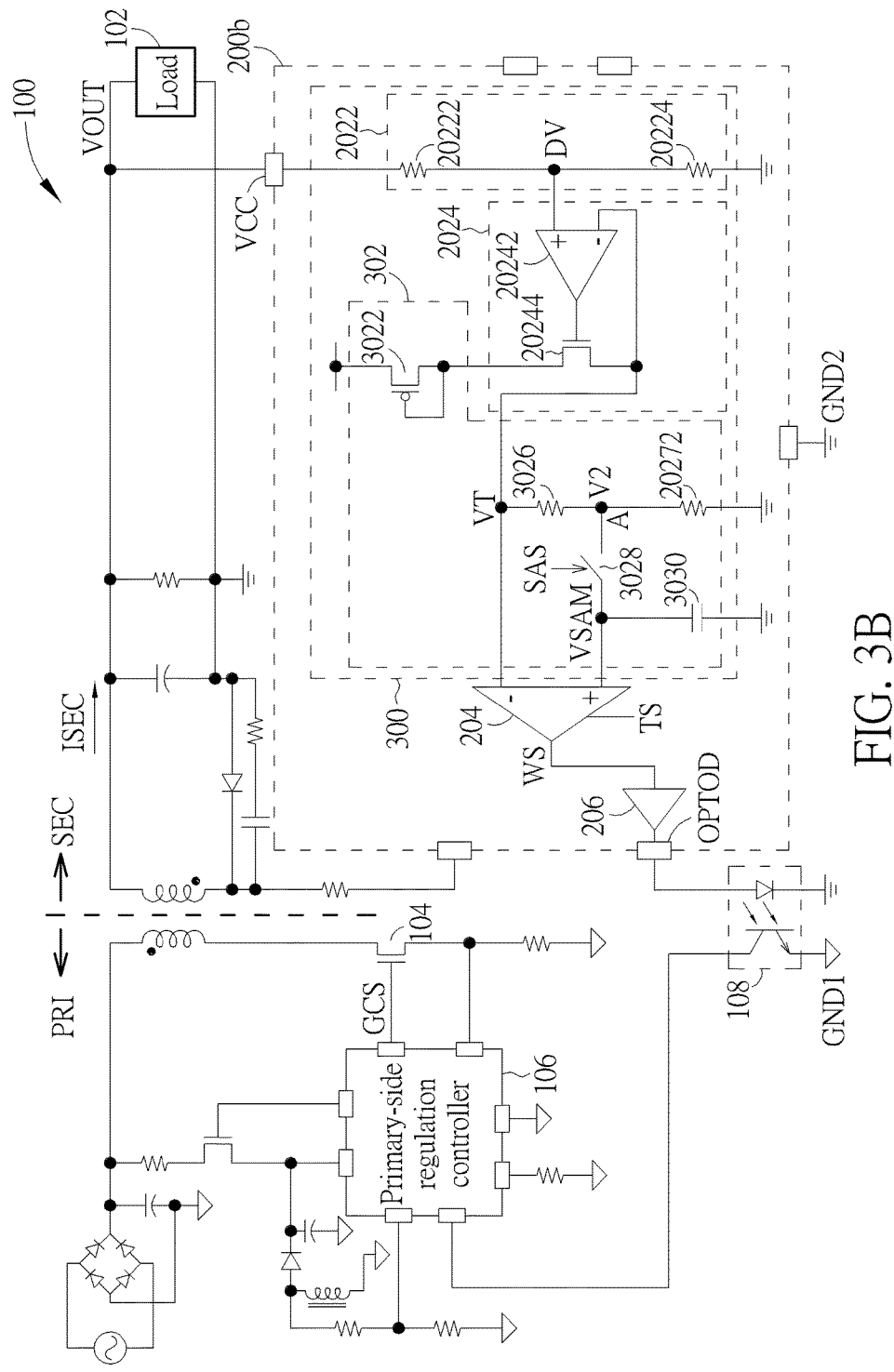
FIG. 3B is a diagram illustrating a controller applied to a secondary side of a power convertor according to another embodiment of the present invention.

In addition, in another embodiment of the present invention (as shown in FIG. 3B), a difference between a controller 200b applied to the secondary side SEC of the power converter 100 and the controller 200a applied to the secondary side SEC of the power converter 100 is that the controller 200b does not include the fifth P-type metal-oxide-semiconductor transistor 3024 and the third resistor 20246. That is to say, the difference between the controller 200b and the controller 200a is that the controller 200b dies not have a current mirror function. Therefore, as shown in FIGS. 2, 3B, at the time T2, the second voltage V2 (corresponding to the time T2) of the node A of the current mirror 302 can be represented by equation (11), wherein VOUT1 is the output voltage VOUT corresponding to the sampling signal SAS (as shown in FIG. 2, because at the time T2, the secondary side SEC of the power converter 100 discharges completely, VOUT1 is the maximum value of the output voltage VOUT):

$$V2 = \frac{R_{20272}}{R_{20272} + R_{3026}} \times \frac{R_{20224}}{R_{20222} + R_{20224}} \times VOUT1 \quad (11)$$

In addition, the tracking value VT can be determined by equation (12):

$$VT = \frac{R_{20224}}{R_{20222} + R_{20224}} \times VOUT \quad (12)$$

In addition, operational principles of the controller 200b can be referred to operational principles of the controller 200a and FIG. 2, so further description thereof is omitted for simplicity.

Figure 4:
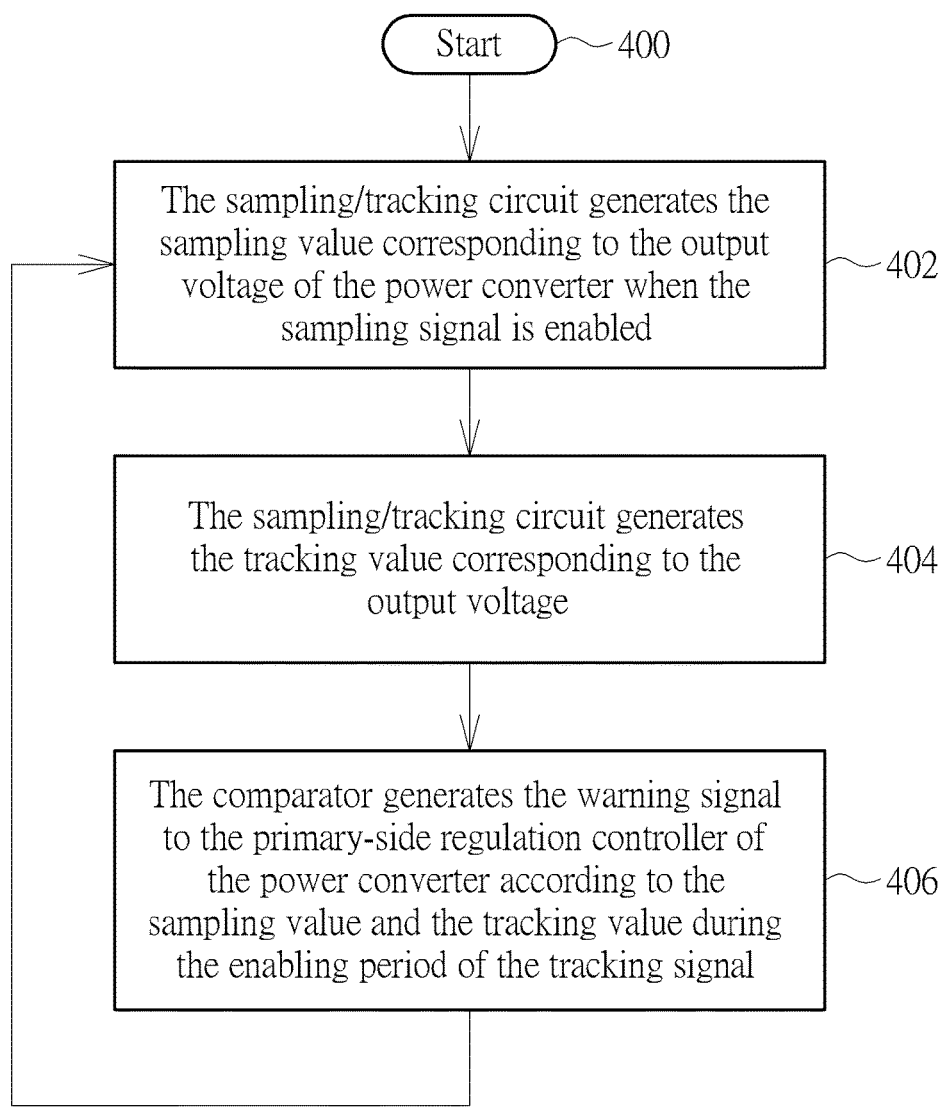
FIG. 4 is a flowchart illustrating an operation method of a controller applied to a secondary side of a power convertor according to a third embodiment of the present invention.

Please refer to FIGS. 1, 2, 4. FIG. 4 is a flowchart illustrating an operation method of a controller applied to a secondary side of a power convertor according to a third embodiment of the present invention. The operation method in FIG. 4 is illustrated using FIGS. 1, 2. Detailed steps are as follows:

Step 400: Start.

Step 402: The sampling/tracking circuit 202 generates the sampling value VSAM corresponding to the output voltage VOUT of the power converter 100 when the sampling signal SAS is enabled.

Step 404: The sampling/tracking circuit 202 generates the tracking value VT corresponding to the output voltage VOUT.

Step 406: The comparator 204 generates the warning signal WS to the primary-side regulation controller 106 of the power converter 100 according to the sampling value VSAM and the tracking value VT during the enabling period of the tracking signal TS, go to Step 402.

In Step 402, the voltage dividing unit 2022 of the sampling/tracking circuit 202 can utilize the first resistor 20222 and the second resistor 20224 to divide the output voltage VOUT to generate the divided voltage DV. The regulator 2024 of the sampling/tracking circuit 202 can generate the first voltage V1 according to the divided voltage DV when the N-type metal-oxide-semiconductor transistor 20244 operates normally, wherein the first voltage V1 relates to the output voltage VOUT, the first voltage V1 is equal to the divided voltage DV, and the first voltage V1 and the third resistor 20246 can determine the first current I1.

As shown in FIG. 2, at the time T1, the gate control signal GCS is disabled, so the secondary side SEC of the power converter 100 starts to discharge (meanwhile, the current ISEC has the maximum value, and the tracking signal TS is also disabled). At the time T2, the secondary side SEC of the power converter 100 discharges completely, and the sampling signal SAS is enabled. As shown in FIG. 1, at the time T2, because the sampling signal SAS is enabled, the second switch 20270 is turned on, resulting in the second voltage V2 (determined by the fourth switch 20272 and the second current I2) of the node A staring to charge the first capacitor 20274 to generate the sampling value VSAM equal to the second voltage V2 at the positive input terminal of the comparator 204 (that is, at the time T2, the first capacitor 20274 will store the sampling value VSAM).

In Step 404, as shown in FIGS. 1, 2, at the time T3, because the sampling signal SAS is disabled and the tracking signal TS is enabled, the second switch 20270 is turned off, and the first switch 20268 and the comparator 204 are turned on, wherein the tracking signal TS is enabled until the time T4, and the sampling signal SAS and the tracking signal TS are not enabled simultaneously. Therefore, as shown in FIG. 1, between the time T3 and the time T4, because the tracking signal TS is enabled, the first switch 20268 is turned on, resulting in the tracking value VT corresponding to the time interval between the time T3 and the time T4 being generated at the negative input terminal of the comparator 204 and the node A. In addition, as shown in FIGS. 3A, 3B, in another embodiment of the present invention, the current mirror 302 included in the sampling/tracking circuit 300 of the controller 200a continuously generates the tracking value VT according to the first voltage V1, that is, no matter whether the tracking signal TS is enabled, the sampling/tracking circuit 300 of the controller 200a continuously generates the tracking value VT according to the first voltage V1.

In Step 406, between the time T3 and the time T4, because the tracking signal TS is enabled, the comparator 204 is turned on. Therefore, between the time T3 and the time T4 (that is, during the enabling period of the tracking signal TS), the comparator 204 can compare the tracking value VT with the sampling value VSAM real time. Before the time T7, because the load 102 is light, the frequency of the gate control signal GCS generated by the primary-side regulation controller 106 is lower (e.g. the frequency of the gate control signal GCS can be less than 1 KHz). Therefore, if at the time T7, the load 102 is increased suddenly, because the frequency of the gate control signal GCS is lower, the response of the primary-side regulation controller 106 corresponding to variation of the output voltage VOUT is also slower, resulting in the output voltage VOUT being reduced drastically. Therefore, at the time T8, the tracking value VT is equal to the sampling value VSAM. After the time T8, because the tracking value VT is less than the sampling value VSAM, the comparator 204 will generate the warning signal WS to the primary-side regulation controller 106, wherein the primary-side regulation controller 106 can increase the enabling period of the gate control signal GCS and the frequency of the gate control signal GCS according to the warning signal WS to rapidly respond to sudden increase of the load 102.

To sum up, the controller applied to the secondary side of the power convertor and the operation method thereof utilize the sampling/tracking circuit to generate the sampling value corresponding to the output voltage of the power convertor and the tracking value corresponding to the output voltage of the power convertor, and utilize the comparator to generate the warning signal to the primary-side regulation controller according to the sampling value and the tracking value. Then, the primary-side regulation controller can increase the frequency of the gate control signal according to the warning signal. Therefore, compared to the prior art, the present invention has advantages as follows: first, because the tracking value corresponds to a real-time output voltage of the power converter, the present invention is suitable for applications requiring a variable output voltage of the power converter; and second, because the present invention determines whether to generate the warning signal to the primary-side regulation controller according to decrease percentage of the output voltage, the present invention can prevent ripple noise from making the comparator to generate the warning signal to the primary-side regulation controller when the output voltage is higher.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A controller applied to a secondary side of a power convertor, comprising:
a sampling/tracking circuit coupled to the secondary side of the power convertor for generating a sampling value corresponding to an output voltage of the power convertor when a sampling signal is enabled, and generating a tracking value corresponding to the output voltage; and
a comparator coupled to the sampling/tracking circuit for generating a warning signal to a primary-side regulation (PSR) controller of the power converter according to the sampling value and the tracking value during an enabling period of a tracking signal, wherein when the tracking value is less than the sampling value, the comparator generates the warning signal to the primary-side regulation controller;
wherein the primary-side regulation controller adjusts a frequency of a gate control signal corresponding to a power switch of a primary side of the power convertor according to the warning signal, and the sampling signal and the tracking signal are not enabled simultaneously.

2. The controller of claim 1, wherein the primary-side regulation controller increases the frequency of the gate control signal according to the warning signal.

3. The controller of claim 1, wherein the sampling/tracking circuit generates the tracking value during the enabling period of the tracking signal.

4. The controller of claim 1, wherein the sampling signal and the tracking signal correspond to the gate control signal of the power switch of the primary side of the power convertor.

5. The controller of claim 1, further comprising:
a driving circuit coupled between the comparator and the primary-side regulation controller of the power converter for transmitting the warning signal to the primary-side regulation controller of the power converter.

6. A controller applied to a secondary side of a power convertor, comprising:
a sampling/tracking circuit coupled to the secondary side of the power convertor for generating a sampling value corresponding to an output voltage of the power convertor when a sampling signal is enabled, and generating a tracking value corresponding to the output voltage, wherein the sampling/tracking circuit comprises:
a voltage dividing unit coupled to the secondary side of the power convertor for generating a divided voltage according to the output voltage;
a regulator coupled to the voltage dividing unit for generating a first voltage according to the divided voltage, wherein the first voltage corresponds to the output voltage; and
a current mirror coupled to the regulator and the comparator for generating the sampling value according to the first voltage when the sampling signal is enabled, and generating the tracking value according to the first voltage during the enabling period of the tracking signal; and
a comparator coupled to the sampling/tracking circuit for generating a warning signal to a primary-side regulation controller of the power converter according to the sampling value and the tracking value during an enabling period of a tracking signal;
wherein the primary-side regulation controller adjusts a frequency of a gate control signal corresponding to a power switch of a primary side of the power convertor according to the warning signal, and the sampling signal and the tracking signal are not enabled simultaneously.

7. A controller applied to a secondary side of a power convertor, comprising:
a sampling/tracking circuit coupled to the secondary side of the power convertor for generating a sampling value corresponding to an output voltage of the power convertor when a sampling signal is enabled, and generating a tracking value corresponding to the output voltage, wherein the sampling/tracking circuit comprises:
a voltage dividing unit coupled to the secondary side of the power convertor for generating a divided voltage according to the output voltage;
a regulator coupled to the voltage dividing unit for generating a first voltage according to the divided voltage, wherein the first voltage corresponds to the output voltage; and
a current mirror coupled to the regulator and the comparator for generating the sampling value according to the first voltage when the sampling signal is enabled, and generating the tracking value according to the first voltage; and
a comparator coupled to the sampling/tracking circuit for generating a warning signal to a primary-side regulation controller of the power converter according to the sampling value and the tracking value during an enabling period of a tracking signal;
wherein the primary-side regulation controller adjusts a frequency of a gate control signal corresponding to a power switch of a primary side of the power convertor according to the warning signal, and the sampling signal and the tracking signal are not enabled simultaneously.

8. An operation method of a controller applied to a secondary side of a power convertor, wherein the controller comprises a sampling/tracking circuit and a comparator, the operation method comprising the following steps:
the sampling/tracking circuit generating a sampling value corresponding to an output voltage of the power convertor when a sampling signal is enabled;
the sampling/tracking circuit generating a tracking value corresponding to the output voltage; and
the comparator generating a warning signal to a primary-side regulation controller of the power converter when the tracking value is less than the sampling value during an enabling period of a tracking signal;
wherein the primary-side regulation controller adjusts a frequency of agate control signal corresponding to a power switch of a primary side of the power convertor according to the warning signal, and the sampling signal and the tracking signal are not enabled simultaneously.

9. The operation method of claim 8, wherein the primary-side regulation controller increases the frequency of the gate control signal according to the warning signal.

10. The operation method of claim 8, wherein the sampling/tracking circuit generates the tracking value during the enabling period of the tracking signal.

11. The operation method of claim 8, wherein the sampling signal and the tracking signal correspond to the gate control signal of the power switch of the primary side of the power convertor.

\* \* \* \* \*